United States Patent [19]

Galvin

[11] Patent Number: 4,964,043
[45] Date of Patent: Oct. 16, 1990

[54] SYSTEM FOR VISUALIZING, IDENTIFYING AND ORDERING GEARING CONFIGURATIONS

[76] Inventor: Thomas M. Galvin, 38 Gardiner Rd., Quincy, Mass. 02169

[21] Appl. No.: 205,928

[22] Filed: Jun. 13, 1988

[51] Int. Cl.$^5$ .............................. G06F 15/22
[52] U.S. Cl. ................... 364/401; 364/403; 283/99; 283/55; 235/385; 434/402; 434/404
[58] Field of Search ................ 364/401, 402, 403; 283/15, 55, 60.1, 98, 99; 235/385; 434/198, 206, 402, 404, 427, 389

[56] References Cited

U.S. PATENT DOCUMENTS

| | | | |
|---|---|---|---|
| 2,581,461 | 1/1952 | Wirth | 434/427 X |
| 3,147,557 | 9/1964 | Maris | 434/404 |
| 3,360,874 | 1/1968 | Myers | 434/198 |
| 3,757,037 | 9/1973 | Bialek | 364/403 X |
| 3,818,616 | 6/1974 | Weber | 434/404 |
| 3,874,095 | 3/1975 | Dewaele | 434/198 |
| 4,509,123 | 4/1985 | Vereen | 364/403 X |
| 4,537,576 | 7/1985 | Thorsheim et al. | 434/404 |
| 4,549,663 | 7/1984 | Dye | 364/403 X |
| 4,783,740 | 11/1988 | Ishizawa et al. | 364/403 |

OTHER PUBLICATIONS

"Paper Dial Identifies Ship Lights as Aid to Navy Trainees";—product advertisement, Popular Mechanics, May 1944, p. 75.
Kiel Videopad 2 Series VP2 Hardware Description.
Boston Gear—Catalog Excerpts—Boston Gear, 14 Hayward Street, Quincy, Mass. 02171.

*Primary Examiner*—Jerry Smith
*Assistant Examiner*—Steven Kibby
*Attorney, Agent, or Firm*—Morse, Altman, Dacey & Benson

[57] ABSTRACT

The present invention enables visualizing, identifying and ordering speed reduction gearing configurations, particularly enclosed worm gear configurations, by a system comprising a mechanical display and a digital computer, which cooperate in a novel manner. The mechanical display includes sequences of adjustable slide media, each having at least a stationary base component and a rotatable disk component of sufficiently large size for convenient visual and manual access. The digital computer includes a host computer and a plurality of dedicated terminals that communicate with the host computer through telephone lines. Each of the terminals contains a programmed read only memory which guides the terminal user, through a sequence of inquiries, to automatically telephone the host computer, to transmit input data from the mechanical display to the host computer, and to display the result data received from the host computer for confirmation or rejection by the user.

15 Claims, 9 Drawing Sheets

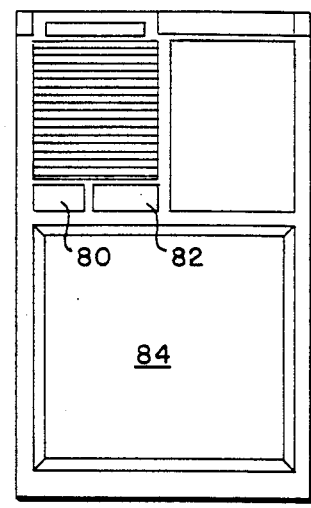
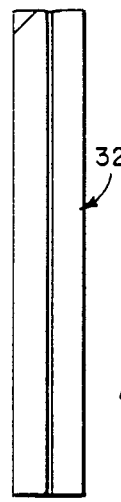
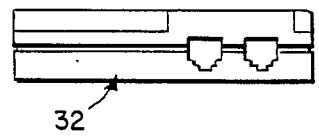
Fig. 7  Fig. 8  Fig. 9
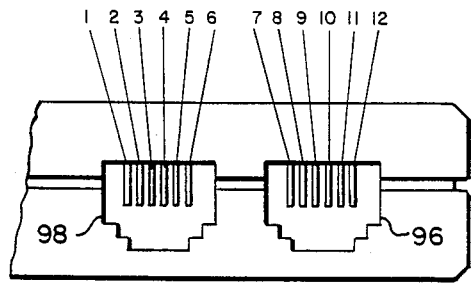
Fig. 10
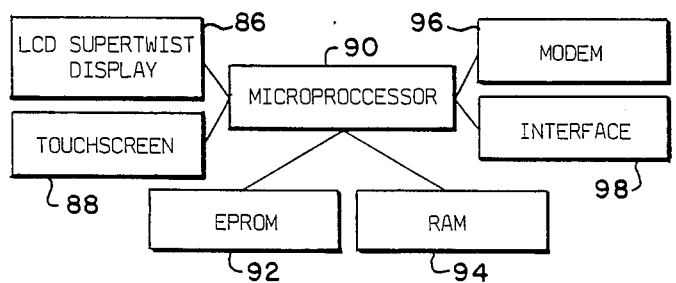
Fig. 11

SYSTEM FOR VISUALIZING, IDENTIFYING AND ORDERING GEARING CONFIGURATIONS

BACKGROUND OF THE INVENTION

1. Field of the Invention

The present invention relates to gearing configurations such as speed-reduction gearing configurations, and, more particularly, to a system for visualizing, identifying and ordering enclosed worm gearing configurations.

2. The Prior Art

Although worm gears have been in use for centuries, modern enclosed worm gear speed reducers were developed during the 1920's and have been in use ever since—without essential change of design. Such speed reducers typically are in the form of a parallelepiped (six-sided) housing from which extend input and output shafts, and on which are affixed one or more mounts. To meet their specific requirements, purchasers must specify the locations and orientations of the shafts and mounts with respect to the housing, as well as criteria of gear box size, gearing power and speed, and, when applicable, competitive interchange (compatibility with the associated drives of different manufacturers).

In the past, the specification process has required a technical comprehension of geometric diagrams, engineering drawings and trigonometric relationships, by which selections have been made from among the thousands of possible permutations and combinations of speed reduction components. In the past also, the specification process has required excellent skills at visualizing how the gear box should be positioned and oriented with respect to ceilings, floors, walls, conveyors, etc. A greatly simplified specification process has long been needed by engineering and purchasing personnel.

Conventional computers, typically, personal computers, can be programmed for communication with data bases to implement algorithms by which relationships among components can be identified, and combinations of these components can be selected. However, consideration of conventional computer systems has not led to practical solutions to the problems indicated above in the selection of gearing configurations, particularly speed reduction gearing configurations.

THE INVENTION

The object of the present invention is to enable visualizing, identifying and ordering speed reduction gearing configurations, particularly enclosed worm gear configurations, by a system comprising a mechanical display means and a digital computer means, which cooperate in a novel manner.

The mechanical display means includes sequences of adjustable slide media, each having at least a stationary base component and a rotatable disk component of sufficiently large size for convenient visual and manual access. The base component presents alphanumeric indicia, typically at 90° or 180° intervals. The disk component typically presents an aspect of a gear box, with an input shaft depicted in one color such as red, at least an output shaft depicted in another color such as blue, and optionally one or more mounts depicted in still another color such as green. The disk component also provides a window by which selected alphanumeric indicia on the base component are visible. This mechanical display is used by alternately visually scanning the various sequences and manually rotating the various disk components until the needed configuration of input and output shafts and mount, and the needed orientation are observed. A mechanical identifier in the form of an alphanumeric indicium representing this configuration and orientation, thereby, is provided by the base component through the window of the disk component representing the configuration and orientation which thus have been isolated.

The digital computer means includes a host computer and a plurality of dedicated terminals that communicate with the host computer through telephone lines. The host computer is programmed so that its memory means contains: a data base system and an expert system. The data base system contains digital electronic identifiers, which refer to off-the-shelf assemblages, and off-the-shelf components that are available from the supplier; and the expert system includes arithmetic/logic means for processing the digital electronic identifiers according to inputs received from the terminals, and for transmitting output data to the terminals. This ouput data refers to price, delivery and availability. Each of the terminals contains a programmed read only memory (PROM) which guides the terminal user, through a sequence of inquiries, to automatically telephone the host computer, to transmit input data from the mechanical display to the host computer, and to display the result data received from the host computer for confirmation or rejection by the user.

The system of the present invention, in one sense, is a marketing tool that places in the hands of reduction gearing customers a relatively inexpensive mechanism, in lieu of the large telephone-book like catalog that has been required in the past, for specifying reduction gearing assemblages. The terminal, which is much smaller than the mechanical display, is too small itself to serve as an aid for visualization and isolation of a needed gearing configuration. The terminal serves as a user friendly intermediary between the mechanical display means which is required for visualization and isolation, and the host computer means which is required for engineering evaluation.

Other objects of the present invention will in part be obvious and will in part appear hereinafter.

BRIEF DESCRIPTION OF THE DRAWINGS

For a fuller understanding of the nature and objects of the present invention, reference is made the accompanying drawings, wherein:

FIG. 7 is a top plan view of a terminal of the type shown in FIG. 1;

FIG. 8 is a side view of the terminal of FIG. 7;

FIG. 9 is an upper end view of the terminal of FIG. 7;

FIG. 10 is an enlarged view of the connector elements of the terminal of FIG. 7;

FIG. 11 is a block diagram of the terminal of FIG. 7;

DETAILED DESCRIPTION OF THE PREFERRED EMBODIMENT

INTRODUCTION

The specific purpose of the illustrated system is to enable a purchaser, i.e. designer, manufacturer, distributor, etc., to specify enclosed worm gear speed reduction configurations being ordered from a supplier. Any selected single reduction or double reduction worm gear speed reducer requires specification of such ratings as input and output shaft revolutions per minute, horsepower, torque, drive ratio, input and output shaft locations, mounting locations, lubricants, dimensions, gear type, gear ratio, coupling bore code, assembly type, reaction rod, service factors that constitute criteria for variations and fluctuations in power sources, operating conditions and loads, etc. Furthermore, as a practical matter, the maximum feasible reduction for any pair of gears is 60:1. Coupling two gear reducers in series can provide a gear reduction of 3600:1. Double reduction speed reducers require all of the specifications of single reduction speed reducers, plus specifications of interstage connections.

It is estimated that in the case of one supplier, approximately 3 million permutations and combinations of its product line can be assembled from standard off-the-shelf components. The system now to be described in detail grossly simplifies the selection process. This system comprises the digital computer means shown in FIGS. 1 and 4-11, and the mechanical display means shown in FIGS. 2, 3 and 12-15.

Figure 1:
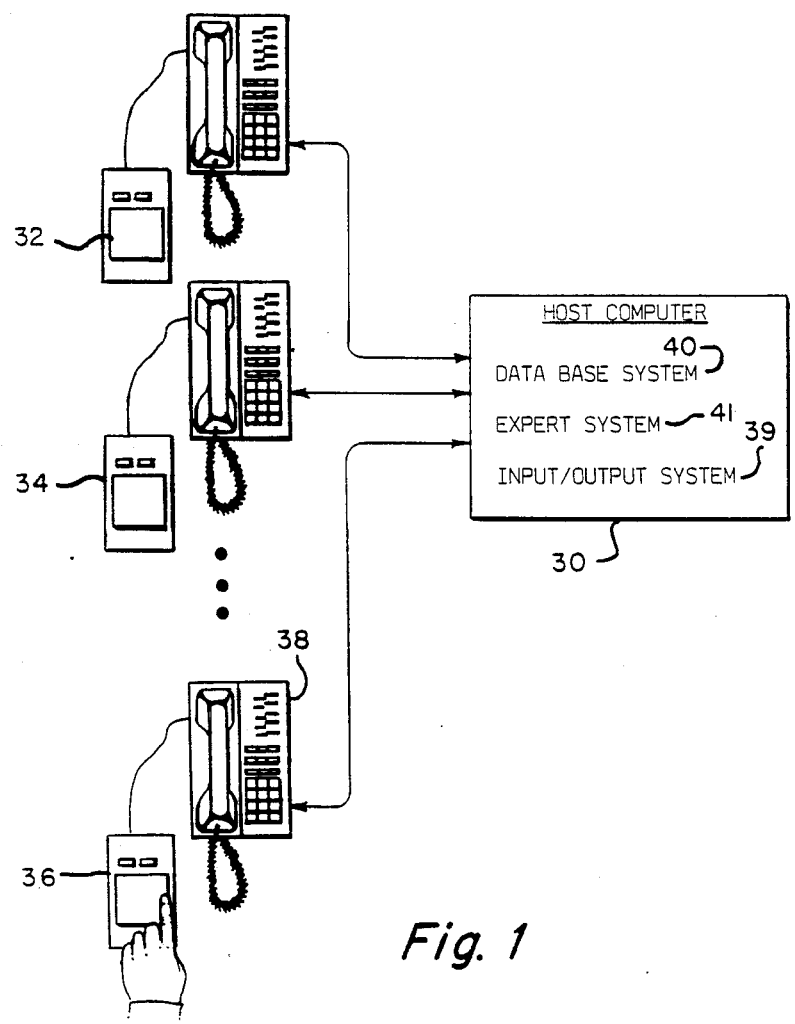
FIG. 1 is a partly pictorial, block diagram of the digital computer system of the present invention.

As shown in FIG. 1, the digital computer system includes a host computer 30, and a plurality of dedicated terminals, three of which are shown at 32, 34 and 36. The host computer is located at the supplier's plant or other designated central site, where its data base can be kept up to date. The terminals are located at remote customer sites at which they are connected through telephone lines for accessing the host computer. It will be observed that each of the terminals is smaller than a telephone set (typically a telephone set of the type sold under the trademark MERLIN by AT&T) to which it is connected so that it is incapable of presenting the expansive array of visual media that is presented by the mechanical display. As shown, however, each of the terminals readily presents alphanumeric information and provides manual access.

THE HOST COMPUTER AND THE TERMINALS

With reference to FIGS. 1, 4, 5 and 6, manually pressing the ON key of one of terminals 32, 34 . . . 36 causes presentation of a series of menus by which the user can specify the equipment he wishes to order. The first menu, as at 44, enables the user to preselect a catalog item number known to him as representing a specified off-the-shelf gear reduction unit. The next two menus, as at 46 and 48, enable the user to specify, respectively: a competitive catalog number for interchange, if any; and speed reduction parameters, such as ratio, base, torque, load, etc., as well as an alphanumeric identifier derived by using the mechanical visual display of FIGS. 2, 3 and 12-15 in a manner to be described below. On entry of this information, the associated telephone dials the host computer 30 at the central site. The host computer includes a basic input/output interface 39, a data base sub-system 40, and an selection sub-system 41. Menus 44, 46 and 48 and the data base to which they refer are stored in random access memories which are contained by data base system 40. The outputs of these random access memories are coordinated as at 52 by an selection system 41, which, as indicated above, includes an arithmetic/logic unit, by which identifiers of stock items are selected. The preselected data at 44 and the expert system data at 52 are converted to translator data as at 54, where they are divided into stock data as at 56 and made-to-order data as at 58.

Figures 5, 6:
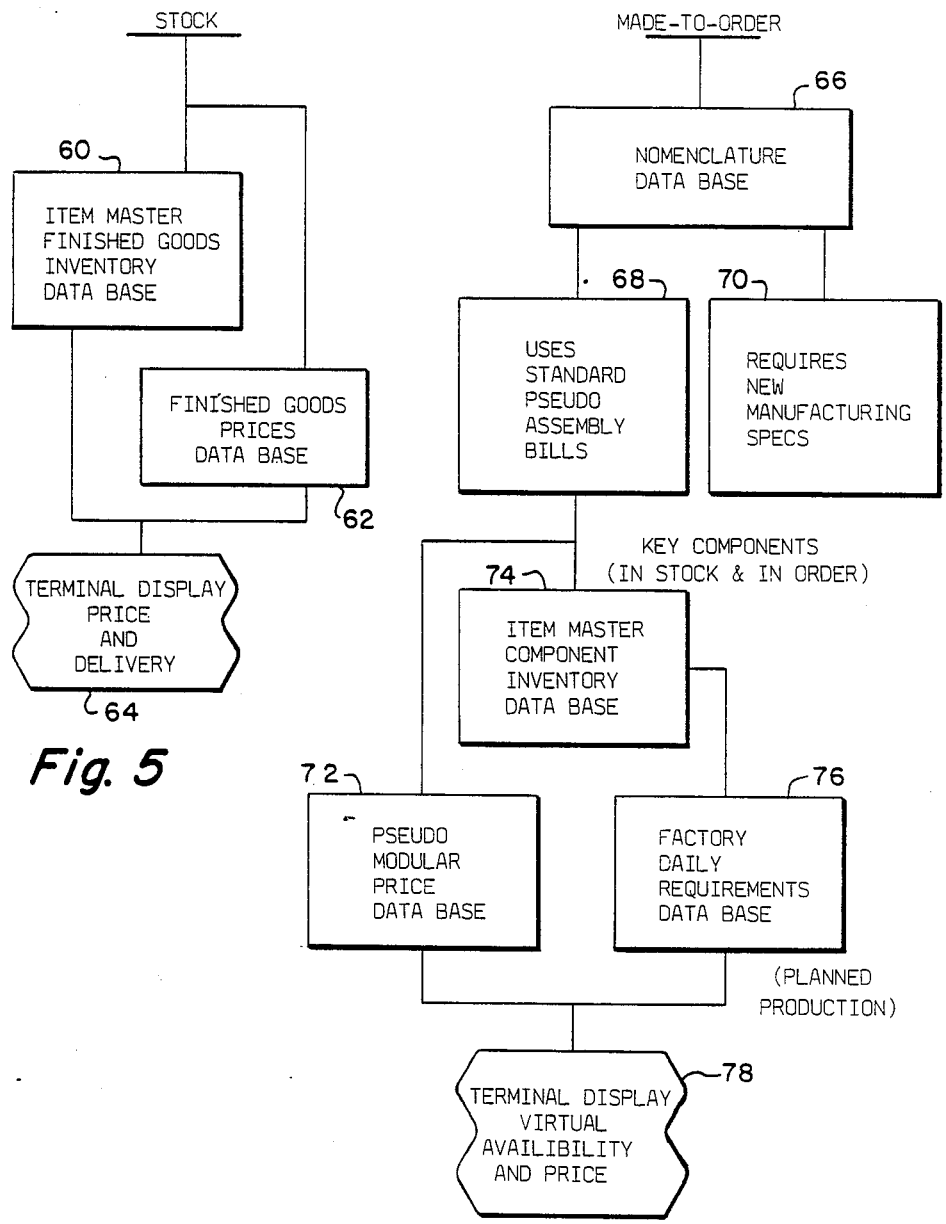
FIG. 5 is one leg of the final part of the flow chart of FIG. 4, showing other steps of the operation of the digital computer system of the present invention.
FIG. 6 is the other leg of the final part of the flow chart of FIG. 4, showing further steps of the operation of the digital computer system of the present invention.

Stock data, as in FIG. 5, is compared with finished goods inventory data as at 60 and finished goods pricing data as at 62 to provide stock price and delivery data as at 64, for transmission back to the calling terminal. Made-to-order data, as in FIG. 6, is processed as at 66 to generate machine recognizable nomenclature identifiers, which in turn are applied as at 68 to produce pseudo assembly bill data. If no nomenclature data is recognized as at 66, then new manufacturing data is generated as at 70. The pseudo assembly bill data as at 68 are subjected to pricing and inventory processing as follows. For pricing, pseudo assembly bill data identifiers are compared to pricing identifiers to produce pseudo modular price identifiers as at 72. During inventory processing, the pseudo assembly bill identifiers are compared with component inventory identifiers as at 74, which in turn are compared with factory requirements identifiers as at 76. The pseudo modular price identifiers as at 72 and the factory requirements identifiers as at 76 are coordinated to provide made-to-order price and delivery identifiers as at 78 for transmission back to the calling terminal If the resulting information presented at the calling terminal is acceptable to the user, he is prompted by the touch screen to enter the order information by touching an indicated portion of the touch screen, in consequence of which the terminal calls the host computer to register the order.

As shown in FIGS. 7 through 11, a preferred terminal for the system of the present invention is a hand held unit of the type manufactured by Kiel Corporation, Amherst, N.H. under the trade designation VP2TT. This terminal, which is capable of being held in the palm of the hand, includes only a very few keys, in the illustrated embodiment, an ON/OFF key 80 and a contrast key 82. The major portion of the face of the unit presents a touch responsive display 84, including a lower liquid crystal screen 86 and an upper touch screen 88, which are superposed. As shown, liquid crystal stratum 86 has a so-called supertwist composition. The active area has a matrix of 120×96 pixels corresponding to 12 lines of 20 to 30 proportionately spaced characters. Touch screen 88 is composed of glass and provides 8 by 6, or 48, touch responsive positions, each in the form of a pair of touch terminals that are shorted by finger contact in a manner well know in the art.

The electronic system of terminal 32, as shown in FIG. 11, includes a microprocessor 90 which controls an erasable programmable memory 92 (EPROM) and a random access memory 94. (RAM) Terminal 32 communicates through a modem interface 96 and an acoustic interface 98. In the illustrated embodiment, details of the components of the terminal are as follows. Microprocessor 90, which is sold by Intel under the trade designation 80c31, runs at 11 MHZ. This 8 bit controller is fabricated in CMOS technology and includes a low power standby mode to conserve the battery The Microprocessor 90 contains a built-in serial port with programmable baud rates, used for serial communications with the modem and the acoustic interfaces. Memories 92 and 94 respectively include 64k bytes of CMOS EPROM and 32K bytes of static RAM. The operating system uses 10K of EPROM and 2K of RAM, which leaves the user with a maximum of 54K of EPROM and 30K of RAM. Acoustic interface 98 is a bi-directional communications interface supporting the following four signals:

XMT—Transmit data (to the host computer);
RCD—Receive data (from the host computer);
DTR—Data terminal ready (for transmission or reception); and
GND—Signal ground Interface pin descriptions are as follows with reference to FIG. 10.

Pin #1: AR=Acoustic interface receiving input. Input range is 0 to 4.5 Volts. This pin is used as external power source input.

Pin #2: XMT=Transmit output. Output levels are approximately −10 V & 5 V. The host computer input for this pin should have high impedance.

Pin #3: GND=For safety and proper operation, ground should be connected to this pin.

Pin #4: AT=Acoustic interface transmitting ouput. The output level of this pin is less than 9 db to comply FCC regulations.

Pin #5: RCD=Receive data input. Input voltage applied to this pin should not exceed +5 V.

Pin #6: DTR=Data transmit ready (+5 v).

Pin #9: RING=Connects to standard telephone "RING".

Pin #10: TIP=Connects to standard telephone "TIP"
Pin #7, 8, 11, 12: Unused.

When the ON/OFF key is depressed, the terminal starts to execute software instructions. The unit shuts itself off after 5 minutes of inactivity. There is no hardwired OFF switch, but an OFF switch can be displayed on the touch screen.

THE MECHANICAL DISPLAY

In the illustrated embodiment of the mechanical display, there are four arrays of circular slide media 99, 101, 103, 105, each array consisting of two groups of nine media each. Each group of nine media is supported on a stiff card, the edge of which is provided with three punched holes 107 for reception of the rings of a loose leaf binder. In other words, each group of nine media is hinged at its edge so as to constitute one of a pair of pages of a notebook or other booklet. When the booklet is opened, two associated groups of nine circular slide media each are presented in a manner that will be described more fully below.

Figure 2:
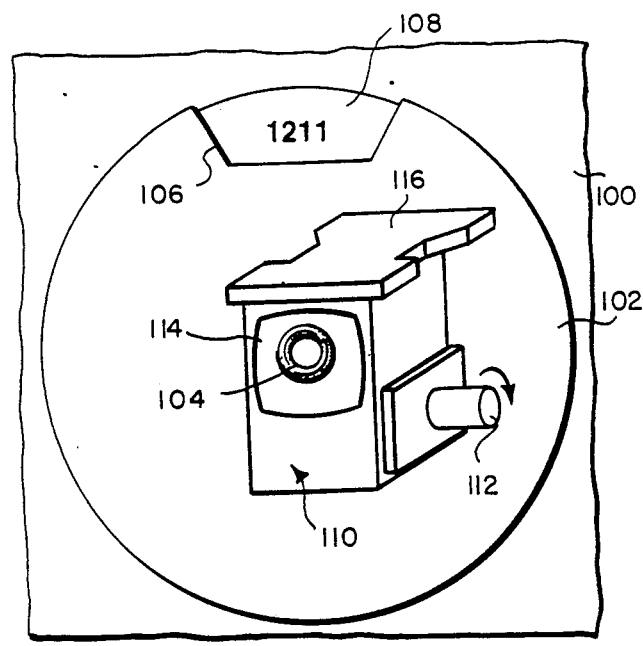
FIG. 2 is a view of one of the mechanical slide media of the present invention.

One of the slide media is shown in FIG. 2 as including a base 100 and a rotatable disk 102. Disk 102 can be rotated manually about a central ferrule 104 which pivotally connects base 100 and disk 102. Disk 102 is provided with a notch 106 that serves as a window to reveal selected alphanumeric indicia 108 which are printed at spaced intervals on base 100 under the periphery of disk 102. On disk 102 is imprinted a two dimensional orthogonal or perspective view 110 of a parallelepiped-shaped gear box. Depicted in this view are: an input shaft 112, which is colored red, extending from one face; an output shaft 114, which is colored blue, extending from another face; and a mount 116, which is colored green, affixed to further face. The arrangement is such that manual rotation of disk 102 to one of four positions at 0°, 90°, 180° and 270° causes the display of an indicium 108, which serves as a mechanical identifier that corresponds to an electronic identifier in the digital computer system.

Figure 3:
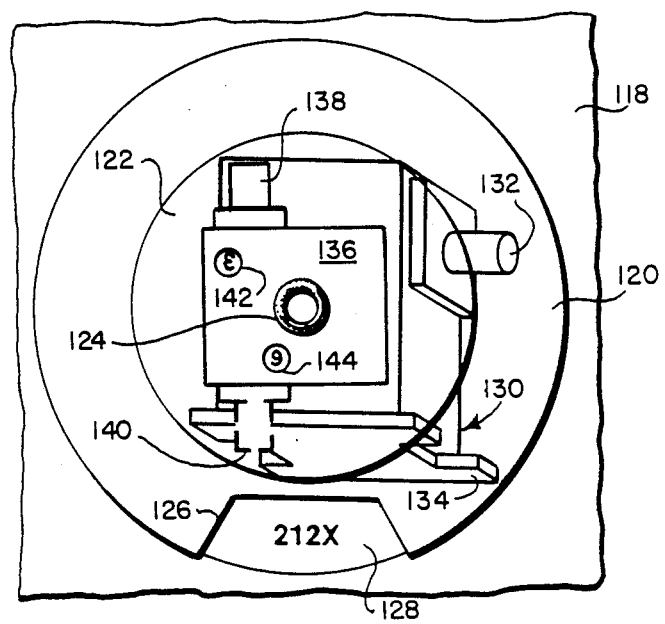
FIG. 3 is a view of another of the mechanical media of the present invention.
Figure 4:
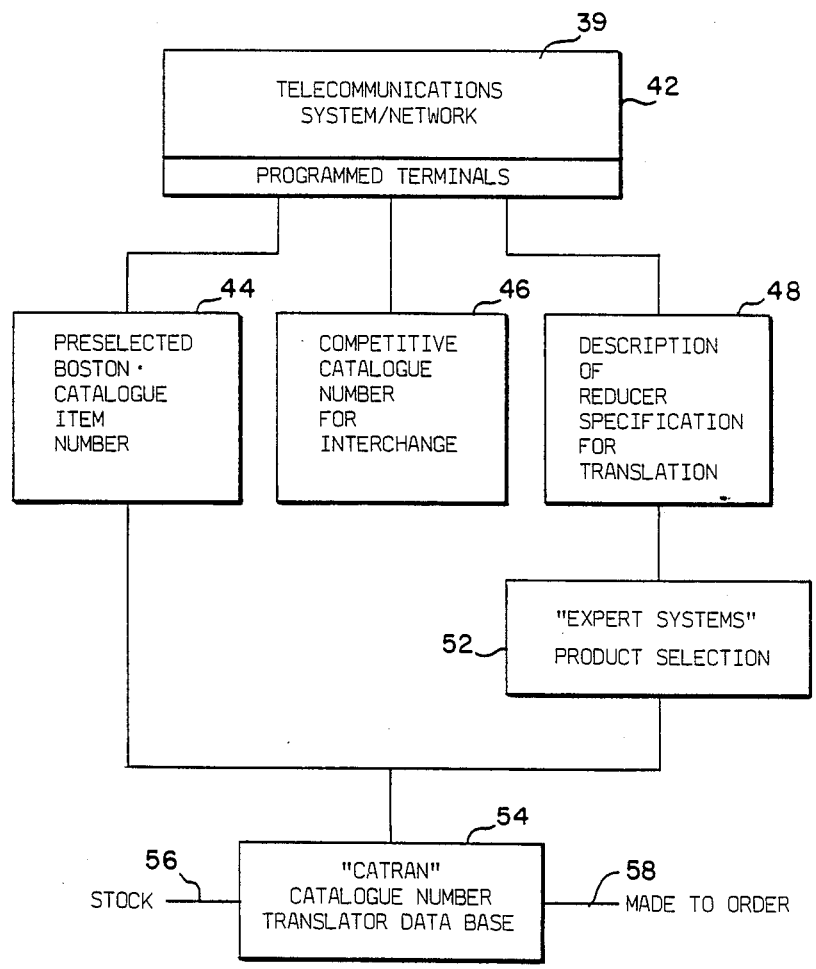
FIG. 4 is the initial part of a flow chart or pseudo code showing steps of the operation of the digital computer system of the present invention.

Another of the slide media is shown in FIG. 3 as including a base 118, a lower opaque disk 120, and an upper disk transparent 122. Upper disk 122 is smaller in diameter than lower disk 120. Both disks can be rotated manually about a central ferrule 124 which pivotally connects base 118, lower disk 120 and upper disk 122. Disk 120 is provided with a notch 126 that serves as a window to reveal selected alphanumeric indicia 128 which are printed at spaced intervals on base 118 under the periphery of lower disk 120. On lower disk 120 is imprinted a two dimensional orthogonal or perspective view 130 of a parallelepiped-shaped gear box. Depicted on this view are: an output shaft 132, which is colored blue, extending from one face; and a mount 134, which is colored green, affixed to another face. On disk 122 is imprinted a two dimensional view 136 of an auxiliary gear box. An output of gear box 136 and an input of gear box 130 are understood to be operatively interconnected. Depicted in connection with auxiliary gear box 136 are alternative input shafts 138, 140. Upper disk 122 is provided with two openings at 142, 144, which serve as windows to reveal selected alphanumeric indicia which are printed at spaced intervals on lower disk 120. The arrangement is such that: manual rotation of lower disk 120 to one of four positions at 0°, 90°, 180° and 270° with respect to base 118 causes the display of an indicium 128, which serves as a mechanical identifier that corresponds to an electronic identifier in the digital computer system; and manual rotation of upper disk 122 to one of four positions at 0°, 90°, 180° and 270° with respect to lower disk 120 causes the display of indicia printed on lower disk 120 and registered with openings 142, 144. These indicia serve as mechanical identifiers that correspond to electronic identifiers in the digital computer system.

Figure 12:
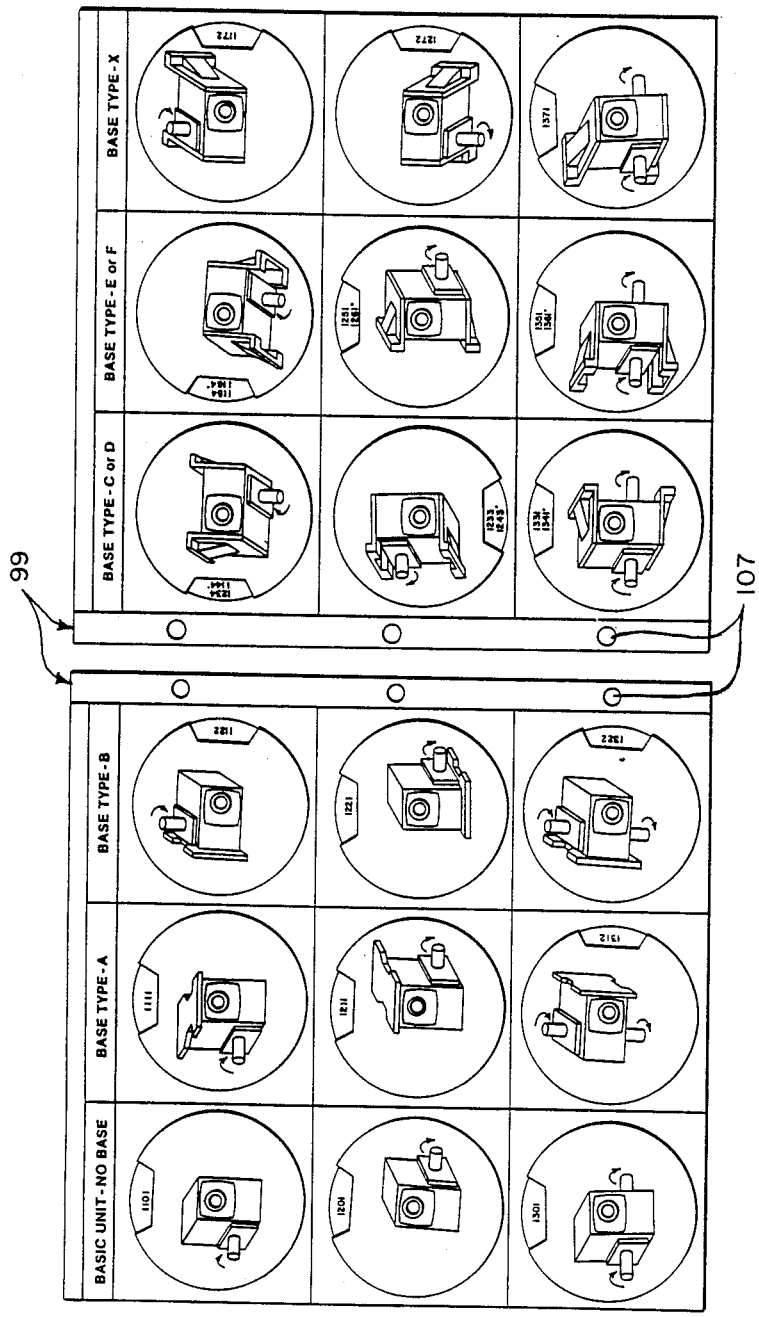
FIG. 12 shows one presentation of the mechanical display of the system of the present invention.

The mechanical display 99 of FIG. 12 shows three rows and six columns of single-reduction speed reducers, of the type shown in FIG. 2, that depict a first set of permutations and combinations of input and output shafts, and mounts at a first set of faces of a six-sided gear box. In any given row, the locations of the input and output shafts remain constant, but the locations of the mounts vary. The arrangement is such that the user, by manipulating the disks, immediately and easily can see which of the permutations and combinations meet his needs and can note the mechanical identifier that corresponds to his selection.

Figure 13:
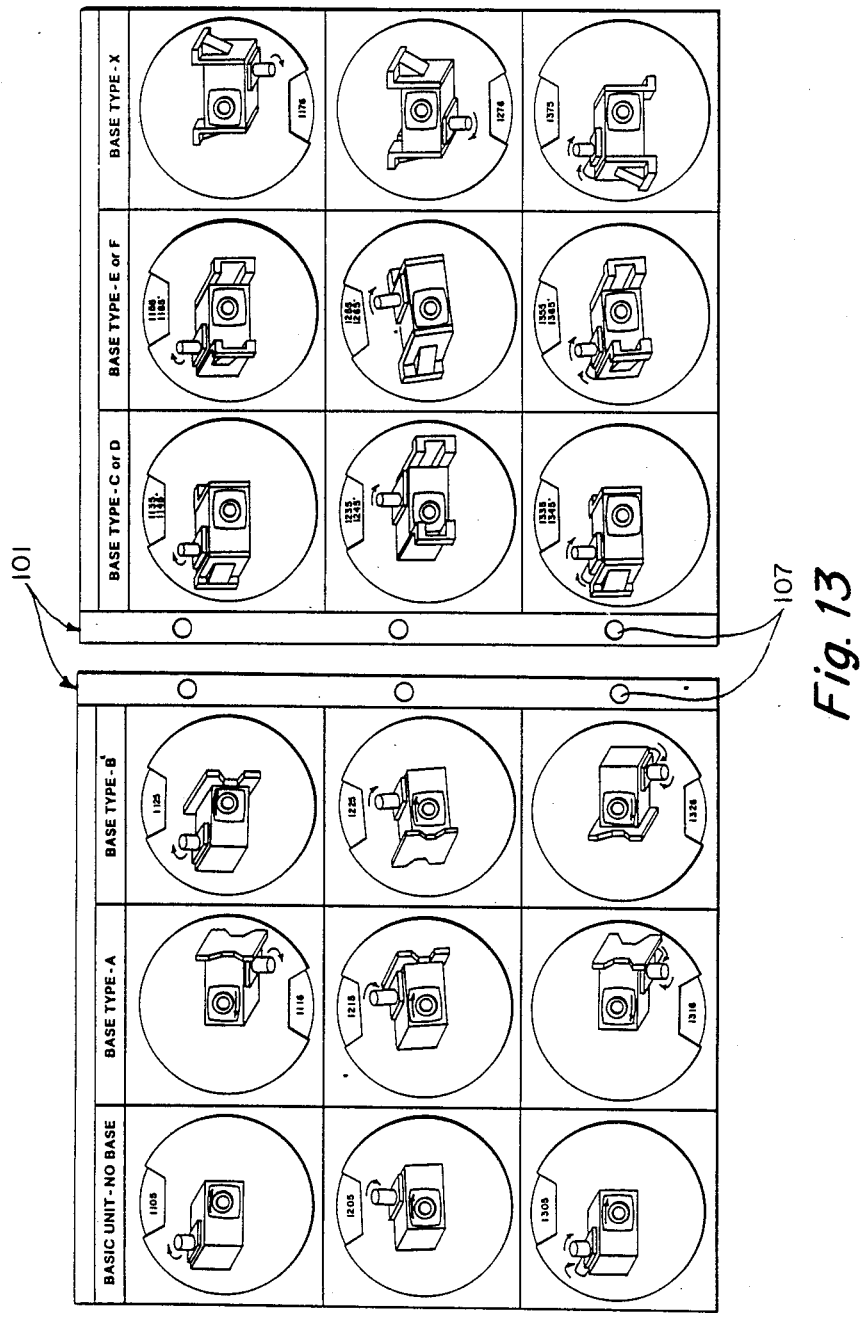
FIG. 13 shows another presentation of the mechanical display of the system of the present invention.

The mechanical display 101 of FIG. 13 shows three rows and six columns of single-reduction speed reducers, of the type shown in FIG. 2, that depict a second set of permutations and combinations of input and output shafts, and mounts at a second set of faces of a six sided gear box. In any given row, the locations of the input and output shafts generally remain constant, but the locations of the mounts vary. The arrangement is such that the user, by manipulating the disks, immediately and easily, can see which of the permutations and combinations meet his needs and can note the mechanical identifiers, on the base and on the lower disk, that correspond to his selection.

Figure 14:
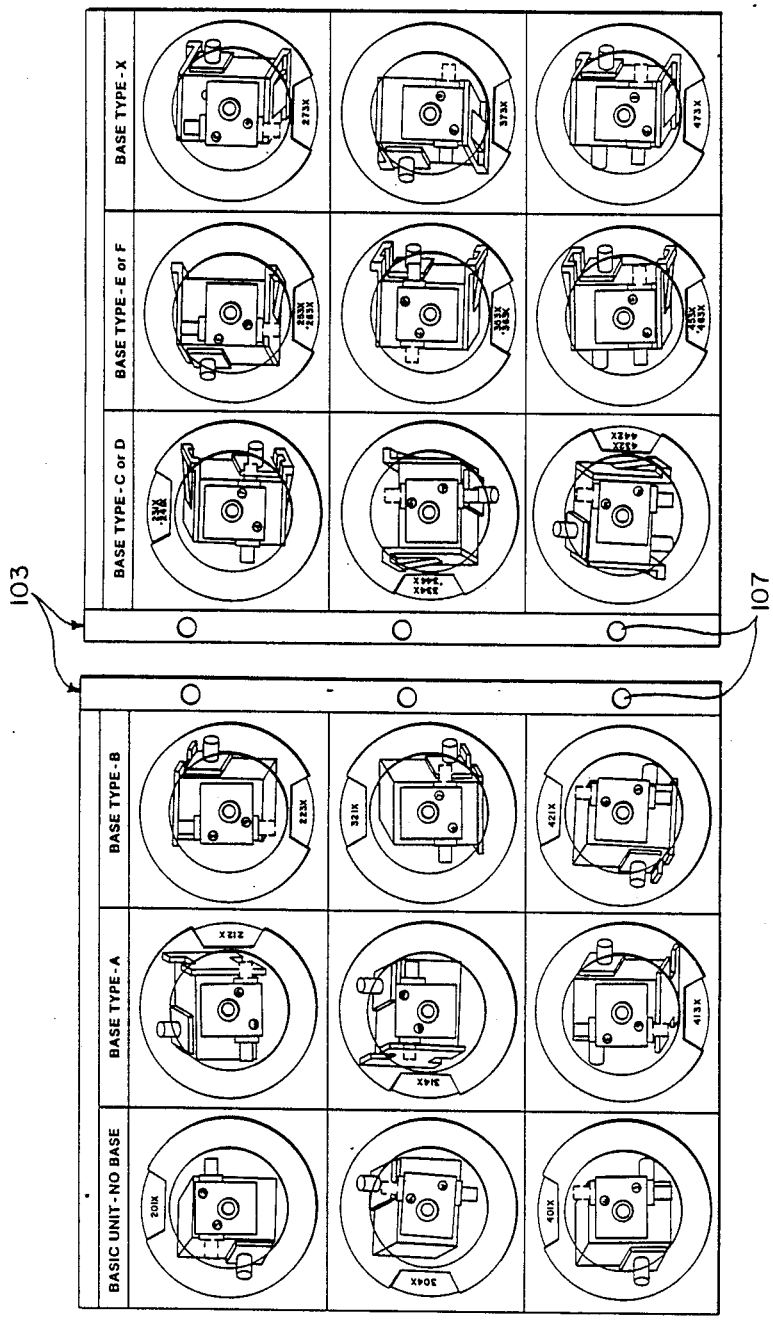
FIG. 14 shows still another presentation of the mechanical display of the system of the present invention.

The mechanical display 103 of FIG. 14 shows three rows and six columns of double-reduction speed reducers, of the type shown in FIG. 3, that depict a set of permutations and combinations of primary gear box and secondary gear box relationships, and a third set of permutations and combinations of input and output shafts, and mounts at a set of faces of the primary and secondary gear boxes. The arrangement is such that the user, by manipulating the lower and upper disks, immediately and easily can see which of the permutations and combinations meet his needs and can note the mechanical identifier that corresponds to his selection.

Figure 15:
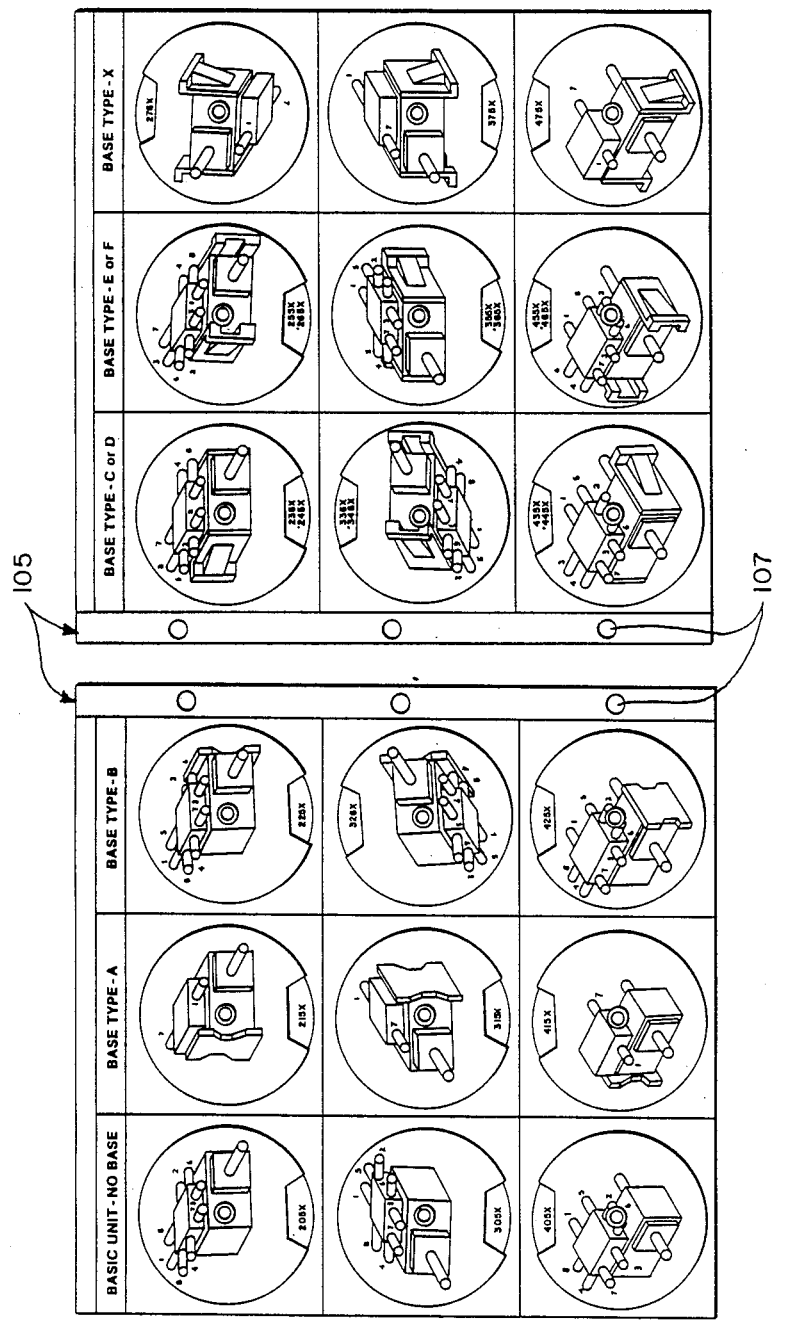
FIG. 15 shows still another presentation of the mechanical display of the system of the present invention.

The mechanical display 105 of FIG. 15 shows three rows and six columns of double-reduction speed reducers, of the type shown in FIG. 2, that depict a set of permutations and combinations of input and output shafts, and mounts at a set of faces of primary and secondary gear boxes that are in fixed relationships. The arrangement is such that the user, by manipulating the disks, immediately and easily can see which of the permutations and combinations meet his needs and can note the mechanical identifier that corresponds to his selection.

OPERATION

In operation, a user of the system of the present invention, presses the ON/OFF button of the terminal which is connected to his telephone. The terminal displays a sequence of inquiries to which the user must respond by touching the touch screen. At some point, under prompting by the terminal, the user observes the mechanical display and manipulates the disks to isolate the mechanical identifier of the speed reducer that he requires. When an alphanumeric key pad is presented by the terminal, the user inputs the mechanical identifier, which is converted by the terminal to an electronic identifier. The terminal makes the call, and transmits the indicated information to the host computer. The host computer processes the electronic identifier and transmits back, to the terminal, order data referring to pricing, availability and delivery. The user then, by touching the touch screen, can indicate acceptance of the order data, thereby automatically calling the host computer and placing the order. If the user does not indicate acceptance of the order data, the inquiry, in effect, is cancelled.

What is claimed is:

1. A master system for visualizing and identifying gearing configurations and orientations, said master system comprising:
   (a) mechanical display means for mechanically displaying an array of slide media;
   (b) each of said slide media including at least a pair of visual components relatively pivotal into a plurality of different angular relationships;
   (c) at least one of said visual components presenting a selected gearing configuration, at least another of said visual components presenting a plurality of mechanical identifiers referring to said selected gearing configuration and to different orientations thereof;
   (d) a data processing system including host computer means for maintaining a database system and a decision system and a plurality of terminals operatively-connected thereto through telephone lines;
   (e) said host computer means including an arithmatic/logic system operatively connected to said data base system and said decision system;
   (f) said database system including sets of electronic identifiers corresponding to sets of said mechanical identifiers;
   (g) said decision system including means for processing said sets of electronic identifiers to produce result identifiers;
   (h) each of said terminals including means for accessing said host computer means, means for transmitting to said decision system electronic identifiers corresponding to said mechanical identifiers, and means for receiving from said decision system result electronic identifiers for visual presentation on said terminals.

2. The master system of claim 1 wherein said array of slide media includes a plurality of rows of said slide media and a plurality of columns of said slide media.

3. The master system of claim 1 wherein an array of said slide media is disposed in two groups carried by two stiff cards that are hinged together.

4. The master system of claim 1 wherein said terminals further comprise a visual display means for displaying alphanumeric characters, said visual display means being a small fraction of the size of said mechanical display means.

5. The master system of claim 1 wherein said gearing configurations are speed reduction configurations.

6. The master system of claim 5 wherein said speed reduction configurations are characterized by showings of input shafts in a first color, output shafts in a second color, and mounts in a third color.

7. The master system of claim 1 wherein said result electronic identifiers correspond to pricing, availability and delivery.

8. A master system for visualizing and identifying gearing configurations and orientations, said master system comprising:
   (a) mechanical display means for displaying an array of slide media contained therein;
   (b) each of said slide media including at least a pair of visual components relatively pivotal into a plurality of different angular relationships;
   (c) at least one of said visual components presenting a selected gearing configuration, at least another of said visual components presenting a plurality of mechanical identifiers referring to said selected gearing configuration and to different orientations thereof.

9. The master system of claim 8 wherein said array of slide media includes a plurality of rows of said slide media and a plurality of columns of said slide media.

10. The master system of claim 8 wherein an array of said slide media is disposed in two groups carried by two stiff cards that are hinged together.

11. A master system for visualizing and identifying gearing configurations and orientations, said master system comprising:
   (a) mechanical display means for mechanically displaying an array of slide media;

(b) each of said slide media including at least a pair of visual components relatively pivotal into a plurality of different angular relationships;

(c) at least one of said visual components presenting a selected gearing configuration, at least another of said visual components presenting a plurality of mechanical identifiers referring to said selected gearing configuration and to different orientations thereof;

(d) a data processing system including host computer means for maintaining a database system and a decision system and a plurality of terminals operatively connected thereto through telephone lines;

(e) said host computer means including an arithmetic/logic system operatively connected to said database system and said decision system;

(f) said database system including sets of electronic identifiers corresponding to sets of said mechanical identifiers;

(g) said decision system including means for processing said sets of electronic identifiers to produce result identifiers;

(h) each of said terminals including means for accessing said host computer means, means for transmitting to said decision system electronic identifiers corresponding to said mechanical identifiers, and means for receiving from said decision system result electronic identifiers for visual presentation on said terminals;

(j) said array of slide media including a plurality of rows of said slide media and a plurality of columns of said slide media;

(k) an array of said slide media being disposed in two groups carried by two stiff cards that are hinged together;

(l) said terminals further comprising a visual display means for displaying alphanumeric characters, said visual display means being a small fraction of the size of said mechanical display means.

12. The master system of claim 11 wherein said gearing configurations are speed reduction configurations.

13. The master system of claim 12 wherein said speed reduction configurations are characterized by showings of input shafts in a first color, output shafts in a second color, and mounts in a third color.

14. The master system of claim 11 wherein said result electronic identifiers correspond to pricing, availability and delivery.

15. The master system of claim 11 wherein said gearing configurations are speed reduction configurations, said speed reduction configurations are characterized by showings of input shafts in a first color, output shafts in a second color, and mounts in a third color, and said result electronic identifiers correspond to pricing, availability and delivery.

* * * * *